United States Patent
Pistoia et al.

(10) Patent No.: US 8,650,546 B2
(45) Date of Patent: Feb. 11, 2014

(54) STATIC ANALYSIS BASED ON OBSERVED STRING VALUES DURING EXECUTION OF A COMPUTER-BASED SOFTWARE APPLICATION

(75) Inventors: Marco Pistoia, Hawthorne, NY (US); Takaaki Tateishi, Yamato (JP); Omer Tripp, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/173,012

(22) Filed: Jun. 30, 2011

(65) Prior Publication Data
US 2013/0007529 A1 Jan. 3, 2013

(51) Int. Cl.
*G06F 9/44* (2006.01)
(52) U.S. Cl.
USPC ........................................................ 717/126
(58) Field of Classification Search
USPC ........................................................ 717/126
See application file for complete search history.

(56) References Cited

U.S. PATENT DOCUMENTS

| | | | |
|---|---|---|---|
| 2005/0166167 A1* | 7/2005 | Ivancic et al. | 716/5 |
| 2007/0157169 A1* | 7/2007 | Chen et al. | 717/120 |
| 2009/0328015 A1* | 12/2009 | Bjorner et al. | 717/142 |
| 2011/0258610 A1* | 10/2011 | Aaraj et al. | 717/128 |

OTHER PUBLICATIONS

Kiezun, Adam et al.; "HAMPI: A Solver for String Constraints"; International Symposium on Testing and Analysis (ISSTA'09); Jul. 19-23, 2009.*

Minamide, Yasuhiko; "Static Approximation of Dynamically Generated Web Pages"; International World Wide Web Conference (WWW 2005); May 10-14, 2005.*

Brat, Guillaume and Willem Visser; "Combining Static Analysis and Model Checking for Software Analysis"; Automated Software Engineering 2001 (ASE'01); Nov. 26-29, 2001.*

Halfond, William G.J. and Alessandro Orso; "Combining Static Analysis and Runtime Monitoring to Counter SQL-Injection Attacks"; Workshop on Dynamic Analysis (WODA 2005); May 17, 2005.*

Young, Michal and Richard N. Taylor; "Combining Static Concurrency Analysis with Symbolic Execution"; IEEE Transactions on Software Engineering, vol. 14, No. 10; Oct. 1988.*

Flanagan, Cormac et al.; "Extended Static Checking for Java"; ACM SIGPLAN Conference on Programming Language Design and Implementation (PLDI'02); Jun. 17-19, 2002.*

Christodorescu, Mihai and Somesh Jha; "Static Analysis of Executables to Detect Malicious Patterns"; Wiconsin Univ-Madison Dept. of Computer Sciences; 2006.*

(Continued)

*Primary Examiner* — Wei Zhen
*Assistant Examiner* — Clint Thatcher
(74) *Attorney, Agent, or Firm* — Patents on Demand P.A.; Brian K. Buchheit; Scott M. Garrett

(57) ABSTRACT

Improving static analysis precision by recording a value pointed to by a string variable within the computer-based software application during the execution of a computer-based software application, modeling an invariant based on the recorded value, where the invariant represents at least one possible value pointed to by the string variable, performing a first static analysis of the computer-based software application to determine whether the invariant is valid with respect to the computer-based software application, and seeding a second static analysis of the computer-based software application with the invariant if the invariant is valid with respect to the computer-based software application.

12 Claims, 3 Drawing Sheets

(56) References Cited

OTHER PUBLICATIONS

"Security-oriented Execution Flow Validation using Static Analysis Techniques"; IP.com Prior Art Database Technical Disclosure; Sept. 22, 2009.*

Adam Kiezun et al., "HAMPI: A Solver for String Constraints", in ISSTA 2009—International Symposium on Testing and Analysis, (Chicago, Illinois, USA), Jul. 19-23, 2009.

Yasuhiko Minamide, "Static Approximation of Dynamically Generated Web", pages. WWW 2005: 432-441, Chiba, Japan.

* cited by examiner

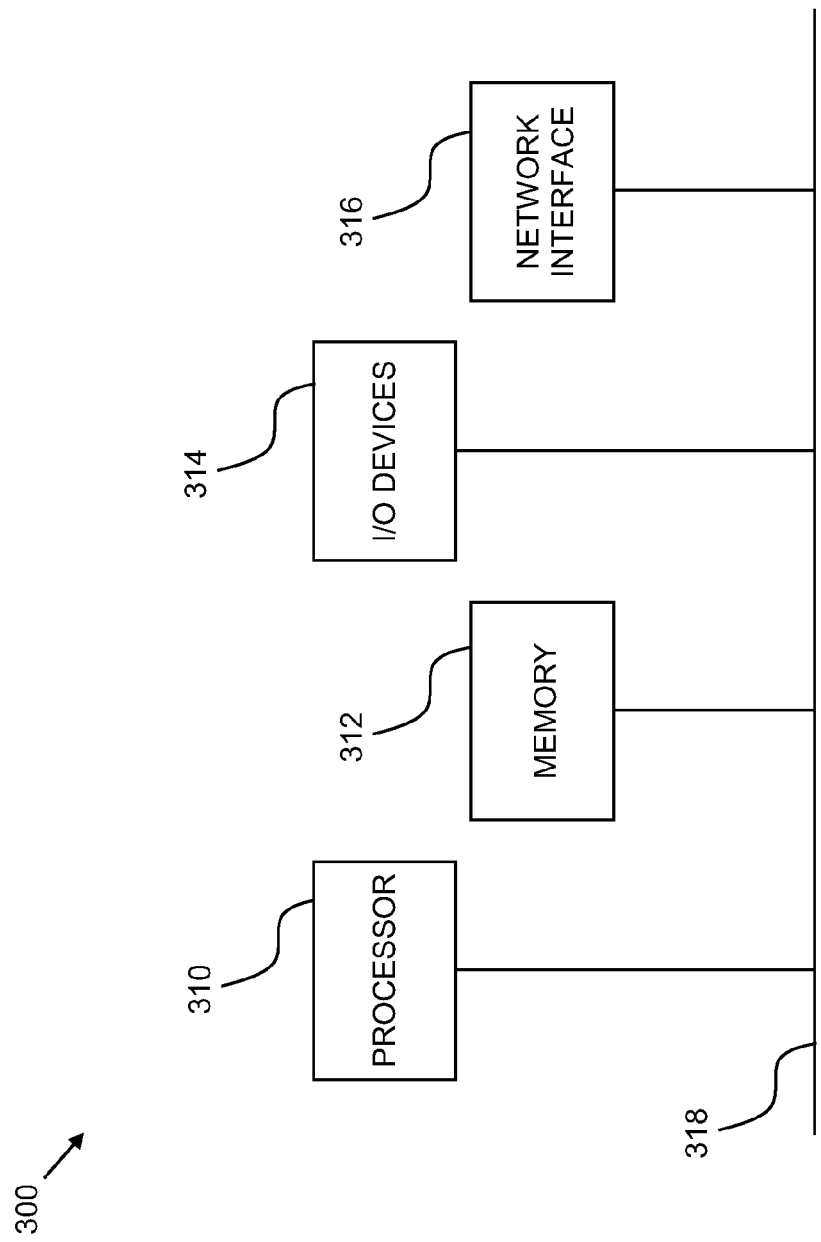

STATIC ANALYSIS BASED ON OBSERVED STRING VALUES DURING EXECUTION OF A COMPUTER-BASED SOFTWARE APPLICATION

BACKGROUND

The present invention relates to analysis of computer-based software applications.

Static analysis of a computer-based software application refers to an analysis of the application that is performed without executing the application. Static analysis is typically performed on the instruction code of an application to identify issues within the instruction code, such as logic errors and security vulnerabilities. One common type of static analysis, known as taint analysis, is used to identify application variables that are "tainted" in that they refer to data that come from or are influenced by an external and/or untrusted source (e.g., a malicious user), thereby making the application potentially vulnerable to attack. Another type of static analysis, known as string analysis, is used to identify string values that may arise during the execution of an application. String analysis may be used in conjunction with other types of static analysis, such as with taint analysis to test countermeasures that an application uses to protect itself against malicious attacks through tainted variables.

BRIEF SUMMARY

In one aspect of the invention a method is provided for improving static analysis precision, the method including recording a value pointed to by a string variable within the computer-based software application during the execution of a computer-based software application, modeling an invariant based on the recorded value, where the invariant represents at least one possible value pointed to by the string variable, performing a first static analysis of the computer-based software application to determine whether the invariant is valid with respect to the computer-based software application, and seeding a second static analysis of the computer-based software application with the invariant if the invariant is valid with respect to the computer-based software application.

Systems and computer-program products embodying the invention are also provided.

BRIEF DESCRIPTION OF THE SEVERAL VIEWS OF THE DRAWINGS

FIG. 3 is a simplified block diagram illustration of an exemplary hardware implementation of a computing system, constructed and operative in accordance with an embodiment of the invention.

DETAILED DESCRIPTION

Figure 1:
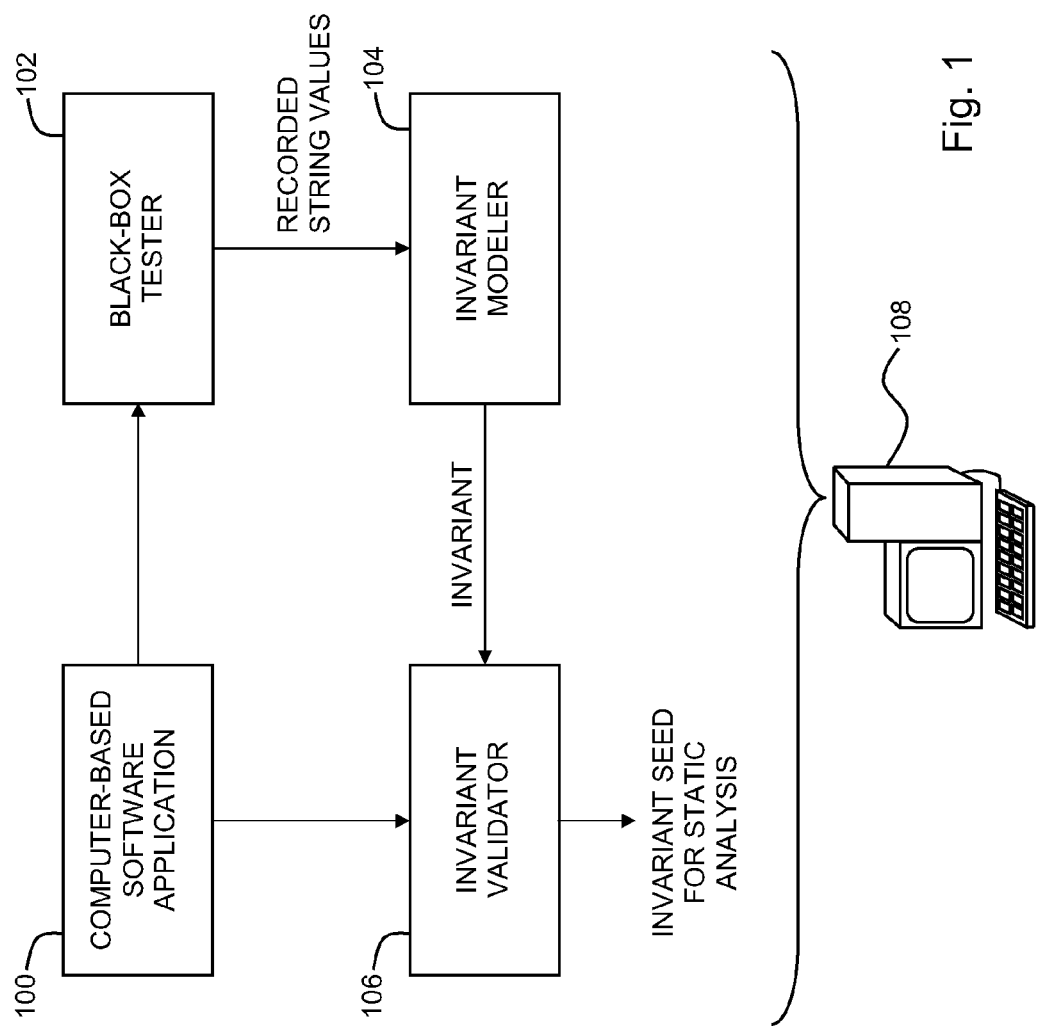
FIG. 1 is a simplified conceptual illustration of a system for improving string analysis precision, constructed and operative in accordance with an embodiment of the invention.

While string analysis may identify all theoretically possible values for a string variable, it would be advantageous, when performing string analysis in support of another type of static analysis, to reduce the set of possible values for a string variable, thereby reducing the complexity of the supported static analysis, while still providing a sound analysis.

The disclosure is now described within the context of one or more embodiments, although the description is intended to be illustrative of embodiments of the invention as a whole, and is not to be construed as limiting other embodiments of the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for improving static analysis precision, constructed and operative in accordance with an embodiment of the invention. In the system of FIG. 1, a computer based software application 100 is executed, such as by a black-box tester 102 in accordance with conventional techniques. One or more values pointed to by one or more string variables within application 100 are recorded by black-box tester 102 during the execution of application 100, such as where application 100 is instrumented at various locations within application 100 in accordance with conventional techniques to allow such values to be recorded. Such values may, for example, include values of strings manipulated inside loops/recursive procedures, where the value at the loop header is recorded, as well as concrete string values pointed to by string variables at particular program locations. Preferably, computer-based software application 100 is executed multiple times, preferably with different inputs each time.

An invariant modeler 104 is configured to model an invariant based on a value or values recorded for a string variable, where the invariant represents at least one possible value pointed to by the string variable. For example, where the values of a string variable that are recorded at a loop header are {"a", "ab", "abb", "abbb", . . . }, then invariant modeler 104 may model a loop invariant for the string variable as the regular expression a[b]*. The invariant may alternatively be represented in accordance with other conventional techniques, such as using a context-free language.

An invariant validator 106 is configured to perform static analysis of application 100 to determine, using conventional techniques, whether the invariant is valid with respect to application 100. Invariant validator 106 may, for example, be a theorem prover such as the Extended Static Checker for Java™

If the invariant is determined to be valid with respect to application 100, a subsequent static analysis of application 100 is preferably seeded with the invariant. For example, where taint analysis is performed on application 100 for a particular tainted variable for which a valid invariant has been determined as described above, any countermeasures that application 100 employs to protect itself against malicious attacks may be analyzed using string values represented by the invariant rather than all possible string values that string analysis would otherwise provide without the invariant.

Any of the elements shown in FIG. 1 are preferably implemented by one or more computers, such as a computer 108, by implementing any of the elements shown in FIG. 1 in computer hardware and/or in computer software embodied in a non-transient, computer-readable medium in accordance with conventional techniques.

Figure 2:
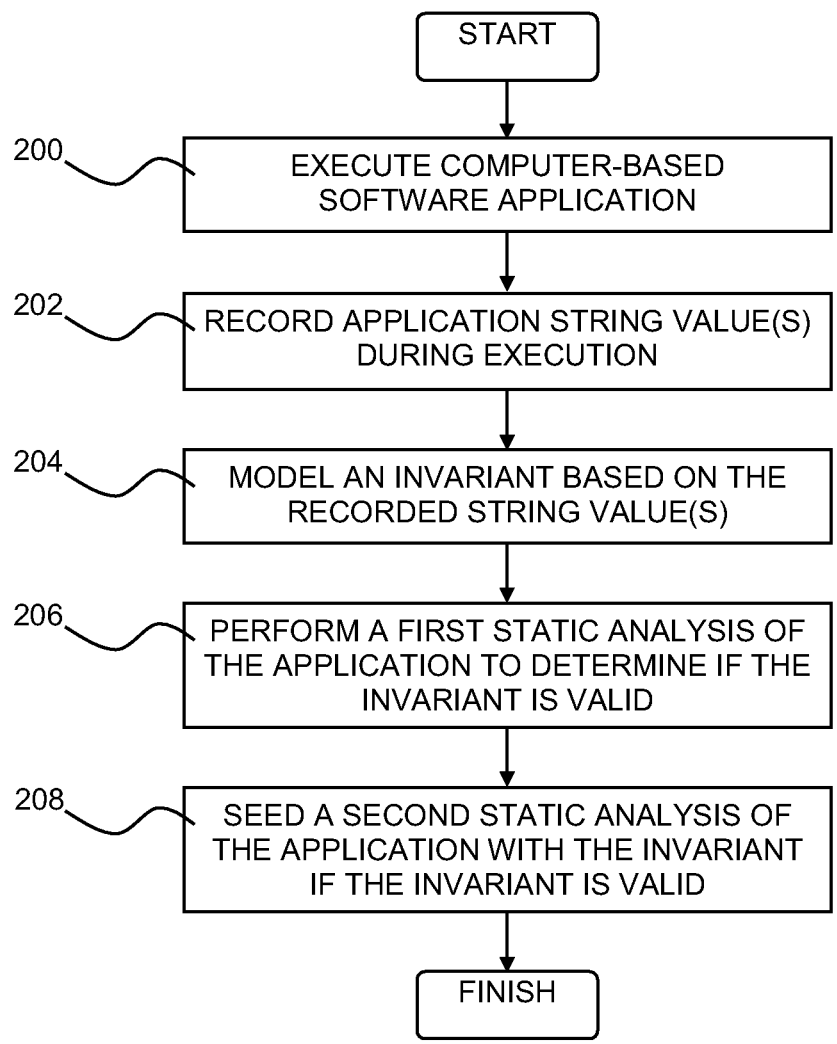
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a computer based software application is executed (step 200). A value pointed to by a string variable within the computer-based software application is recorded during the execution of the computer-based software application (step 202). An invariant is modeled based on the recorded value, where the invariant represents at least one possible value pointed to by the string variable (step 204). A first static analysis of the computer-based software application is performed to determine whether the invariant is valid with respect to the computer-based software application (step 206). A second static analysis of the computer-based software application is seeded with the invariant if the invariant is valid with respect to the computer-based software application (step 208).

The system of FIG. 1 and method of FIG. 2 may be employed to reason about aliasing within an application, such as to decide if strings s and s1 in the following two statements are aliased: x.f=s; String s1=y.f. Values for s and s1 may be recorded during one or more executions of the application as described hereinabove, where if s and s1 (or equivalently, x and y), are observed to be aliased during an execution of the application, then subsequent static analysis of the application should be conservative and take this scenario into account. Similarly, if s and s1 (or equivalently, x and y) are observed not to be aliased during an execution of the application, then this scenario, too, should be considered during subsequent static analysis of the application. If only one of these scenarios arises during execution, then subsequent static analysis of the application can avoid exploring the consequences of the other scenario if, indeed, it can be proved that that other scenario is impossible.

Furthermore, by observing different values assumed by a string variable at a particular code location during execution of an application, the system of FIG. 1 and method of FIG. 2 may be employed to propose candidate approximations of the string variable. For example, given the application instructions String s=getPath(); File f=new File(s), where in a series of executions of the application the following values arise for s: {c:\temp\a.txt, c:\temp\b.txt, c:\temp\fgh.txt}, based on these values c:\temp\.*.txt may be proposed as a conservative regular approximation of s, thus providing partial knowledge about the ensuing file creation step during subsequent static analysis of the application, provided the approximation is determined to be valid.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising: modeling an invariant based on a recorded value pointed to by a string variable within a computer-based software application during the execution of the computer-based software application, where the invariant represents at least one possible value pointed to by the string variable; recording the value pointed to by the string variable within the computer-based software application during the execution of the computer-based software application; executing the computer-based software application a plurality of times; performing the recording of the value pointed to by the string a plurality of times to record a plurality of values pointed to by the string variable, wherein the modeling of the invariant comprises modeling the invariant based on the plurality of values; performing a first static analysis of the computer-based software application using a theorem prover to determine whether the invariant is valid with respect to the computer-based software application; and seeding a second static analysis of the computer-based software application with the invariant if the invariant is valid with respect to the computer-based software application; wherein the recording, the modeling, the performing, and the seeding are implemented in at least one of: a) computer hardware, and b) computer software embodied in a non-transitory, computer-readable storage medium.

2. The method of claim 1 wherein the step of performing a first static analysis comprises performing a string analysis to determine whether the invariant is valid with respect to the computer-based software application.

3. The method of claim 1 wherein the step of seeding a second static analysis comprises seeding a taint analysis.

4. A system comprising: one or more processors;
one or more non-transitory storage mediums storing program instructions executable upon the one or more processors; an invariant modeler, comprising at least a subset of the program instructions, configured to model an invariant based on a recorded value pointed to by a string variable within a computer-based software application during the execution of the computer-based software application, where the invariant represents at least one possible value pointed to by the string variable; a subset of the program instructions to record the value pointed to by the string variable within the computer-based software application during the execution of the computer-based software application; a subset of the program instructions execute the computer-based software application a plurality of times; a subset of the program instructions to perform the recording of the value pointed to by the string a plurality of times to record a plurality of values pointed to by the string variable, wherein the modeling of the invariant comprises modeling the invariant based on the plurality of values; an invariant validator, comprising at least a subset of the program instructions, configured to perform a first static analysis of the computer-based software application using a theorem prover to determine whether the invariant is valid with respect to the computer-based software application, and a subset of the program instructions to seed a second static analysis of the computer-based software application with the invariant if the invariant is valid with respect to the computer-based software application.

5. The system of claim 4 and further comprising a black-box tester configured to record the value pointed to by the string variable within the computer-based software application during the execution of the computer-based software application.

6. The system of claim 5 wherein the black-box tester is configured to execute the computer-based software application a plurality of times record a plurality of values pointed to by the string variable, and wherein the invariant modeler is configured to model the invariant based on the plurality of values.

7. The system of claim 4 wherein the invariant validator is configured to perform the first static analysis by performing a string analysis to determine whether the invariant is valid with respect to the computer-based software application.

8. The system of claim 4 wherein the invariant validator is configured to seed the second static analysis by seeding a taint analysis.

9. The system of claim 4 wherein black-box tester, invariant modeler, and invariant validator are implemented in at least one of:
   a) computer hardware, and
   b) computer software embodied in a non-transitory, computer-readable storage medium.

10. A computer program product comprising: a non-transitory computer-readable storage medium; and computer-readable program code embodied in the computer-readable storage medium, wherein the computer-readable program code is configured to: model an invariant based on a recorded value pointed to by a string variable within a computer-based software application during the execution of the computer-based software application, where the invariant represents at least one possible value pointed to by the string variable; record the value pointed to by the string variable within the computer-based software application during the execution of the computer-based software application; execute the computer-based software application a plurality of times; perform the recording of the value pointed to by the string a plurality of times to record a plurality of values pointed to by the string variable, wherein the modeling of the invariant comprises modeling the invariant based on the plurality of values; perform a first static analysis of the computer-based software application using a theorem prover to determine whether the invariant is valid with respect to the computer-based software application; and seed a second static analysis of the computer-based software application with the invariant if the invariant is valid with respect to the computer-based software application.

11. The computer program product of claim 10 wherein performing the first static analysis comprises performing a string analysis to determine whether the invariant is valid with respect to the computer-based software application.

12. The computer program product of claim 10 wherein seeding the second static analysis comprises seeding a taint analysis.

* * * * *